US 6,676,177 B2

(12) United States Patent
Daoud et al.

(10) Patent No.: US 6,676,177 B2
(45) Date of Patent: Jan. 13, 2004

(54) QUARTER TURN LATCH

(75) Inventors: Bassel H. Daoud, Parsippany, NJ (US); David S. Kerr, Morris Plains, NJ (US); Ivan Pawlenko, Holland, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/854,724

(22) Filed: May 14, 2001

(65) Prior Publication Data

US 2002/0171249 A1 Nov. 21, 2002

(51) Int. Cl.[7] .................................................. E05C 3/04
(52) U.S. Cl. ......................................... 292/202; 292/91
(58) Field of Search ............................ 292/19, 91, 303, 292/17, 20, 80, 87, 202; 411/508–510, 549, 553

(56) References Cited

U.S. PATENT DOCUMENTS

| | | | |
|---|---|---|---|
| 4,214,349 A | | 7/1980 | Munch |
| 4,705,442 A | * | 11/1987 | Fucci ........................ 411/510 |
| 4,938,645 A | * | 7/1990 | Wollar ....................... 411/508 |
| 5,387,065 A | * | 2/1995 | Sullivan ....................... 411/48 |
| 5,468,108 A | * | 11/1995 | Sullivan ..................... 411/510 |
| 5,672,038 A | * | 9/1997 | Eaton ......................... 411/510 |
| 5,718,549 A | * | 2/1998 | Noda ......................... 411/553 |
| 5,813,810 A | * | 9/1998 | Izume ........................ 411/510 |
| 5,913,650 A | | 6/1999 | Daoud |
| 6,173,055 B1 | | 1/2001 | Eckhardt et al. |

* cited by examiner

*Primary Examiner*—Gary Estremsky

(57) ABSTRACT

A quarter turn latch for joining a cover to a housing of an enclosure enables a technician to lock the enclosure by simply slamming the cover shut. The latch also enables a technician to unlock the enclosure by rotating the shaft by a quarter turn. The latch includes a shaft and a clasp. The shaft includes a head and a tail. The tail includes peripherally alternating sets of longitudinally spaced teeth and tail cam surfaces. Each tooth has a shoulder facing the head of the shaft and a tooth cam surface. The perimeter of a cross section of each tail cam surface is arcuate. The clasp includes pawls. When the tail is inserted into the clasp, each pawl is in contact with the tail cam surface, the tooth cam surface, or the shoulder. The latch prevents unauthorized access to the enclosure by requiring specific tools to rotate the shaft. The latch is applicable to a wide variety of equipment enclosures such as fiber optic interconnection devices, fiber closures, and fiber cross connect fields, used in a variety of environments.

20 Claims, 14 Drawing Sheets

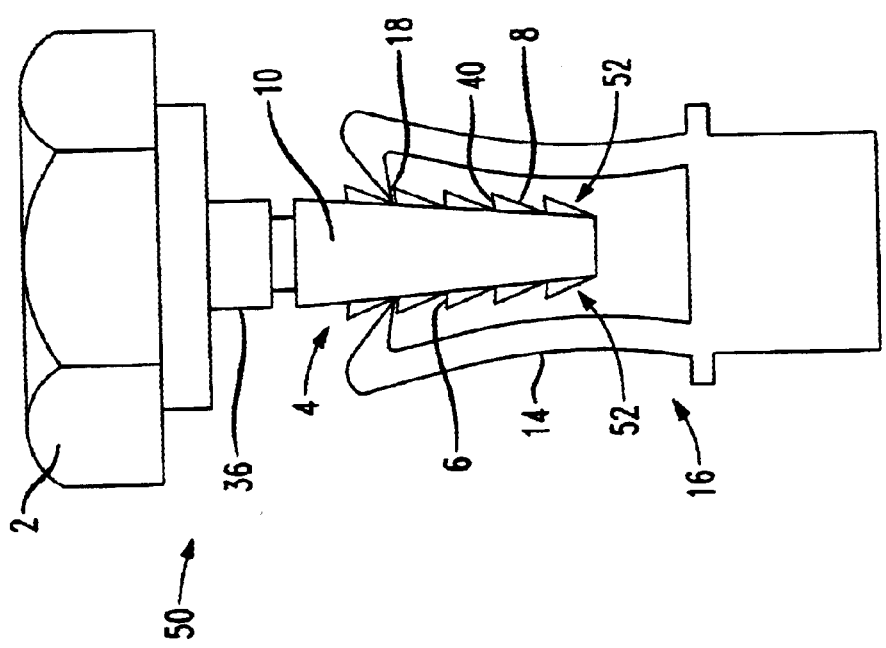
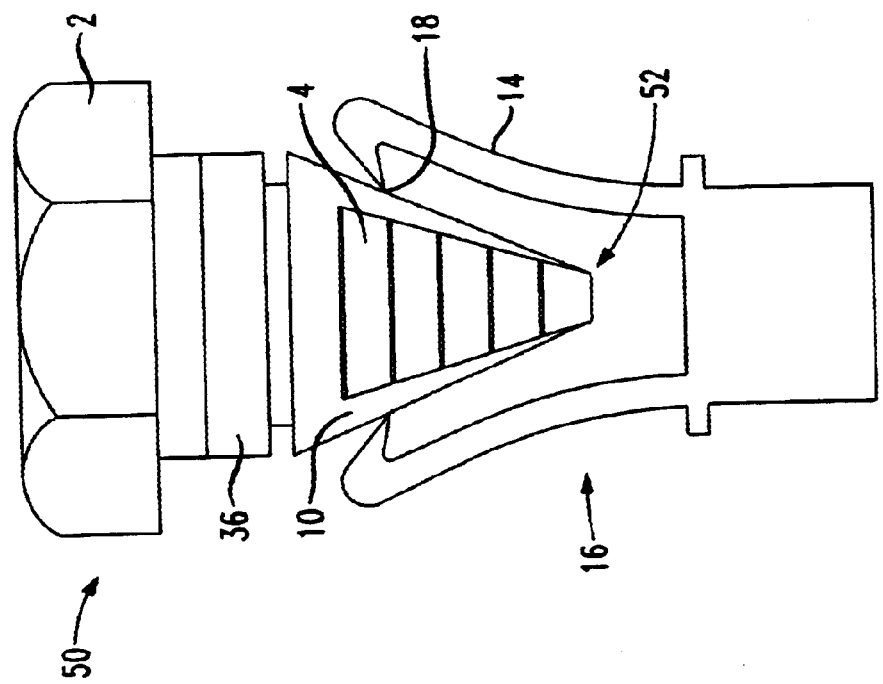

QUARTER TURN LATCH

FIELD OF THE INVENTION

The present invention is related to fastening devices, and particularly to a latch used for securing telecommunications equipment.

BACKGROUND

Equipment enclosures house various types of equipment, such as electrical or telecommunications equipment. For example, a building entrance protector (BEP) may house the interface hardware between the telephones of an office building and an exterior telephone cable having a number of twisted copper pairs that carry the voice signals for those telephones. FIG. 8 is an illustration of a typical BEP. A BEP may also be used to house the interface hardware for systems based on fiber optical communications. Similarly, BEP enclosures may be used with telecommunications systems carrying signals other than just telephone voice signals.

Equipment enclosures are typically located in accessible areas, such as basements, closets, and offices. Thus, it is often desirable to control access to equipment enclosures. Access may be controlled by the type of mechanism used to hold together the parts that form the enclosure, such as the cover and the housing. As shown in FIG. 8, cover 70 is attached to the enclosure by attaching mechanism 74. Also, housing 72 is attached to the enclosure by attaching mechanism 76. These attaching mechanisms may comprise special security screws to securely lock the enclosure, thereby restricting access to only those individuals who have special tools designed to remove those security screws. Two such screws are 216-type screws and KS-type screws, each of which requires a different special tool. KS-type screws and 216-type screws are described in U.S. Pat. No. 5,913,650, issued to Daoud and are shown herin in FIGS. 9A, 9B, 10A, 10B, 11A, and 11B. A regular slotted or Phillips-head screw may also be used to lock the enclosure.

Typically, the enclosures, which house the equipment, such as fiber optic components, must be locked after all work on the equipment is completed. It is not uncommon for technicians, who are often pressed for time, to slam the equipment cover shut without locking the cover. Also, because the BEP is typically wall mounted, it is not uncommon for the cover to swing to the closed position. Because the cover may appear to be locked, the technician may forget to lock the mechanism with the required tool. Thus, a need exists for a locking mechanism that provides a self-locking feature that enables a technician to lock the enclosure by simply slamming the cover shut.

SUMMARY OF THE INVENTION

A latch for joining a cover to a housing, includes a shaft and a clasp. The shaft includes a head and a tail. The tail includes peripherally alternating sets of longitudinally spaced teeth and tail cam surfaces. Each tooth has a shoulder facing the head of the shaft and a tooth cam surface. The perimeter of a cross section of each tail cam surface is arcuate. The clasp includes pawls. When the tail is inserted into the clasp, each pawl is in contact with the tail cam surface, the tooth cam surface, or the shoulder.

BRIEF DESCRIPTION OF THE FIGURES

The invention is best understood from the following detailed description when read in connection with the accompanying drawing. The various features of the drawings may not be to scale. Included in the drawing are the following figures:

FIG. 4A is a diagram of a shaft inserted into a clasp showing the pawls in contact with the tail cam surfaces in accordance with the present invention;

FIG. 4B is a diagram of a shaft inserted into a clasp showing the pawls in contact with the sets of teeth in accordance with the present invention;

DETAILED DESCRIPTION

Figure 1A:
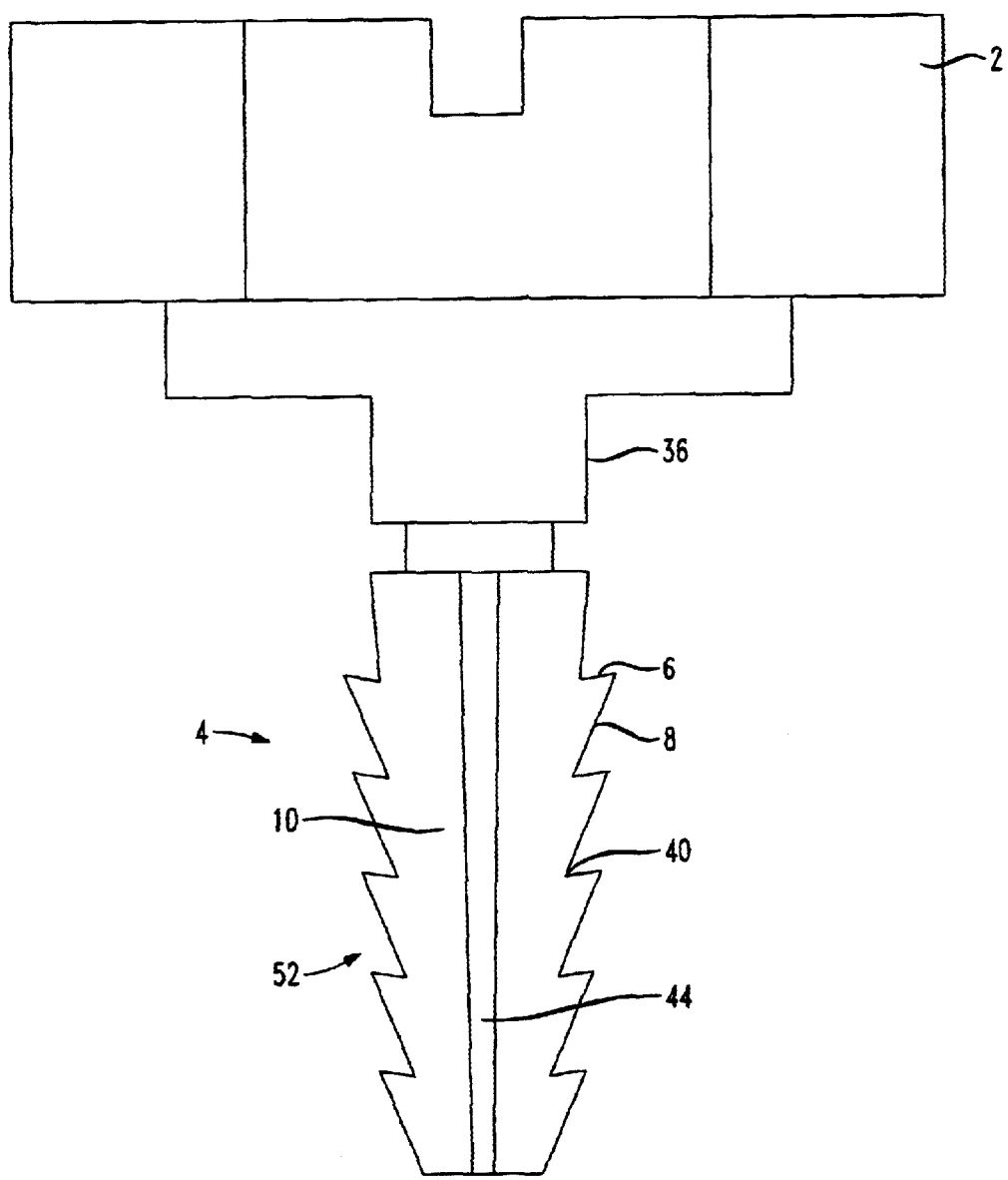
FIG. 1A is a front view of an exemplary embodiment of a shaft in accordance with the present invention.
Figure 1B:
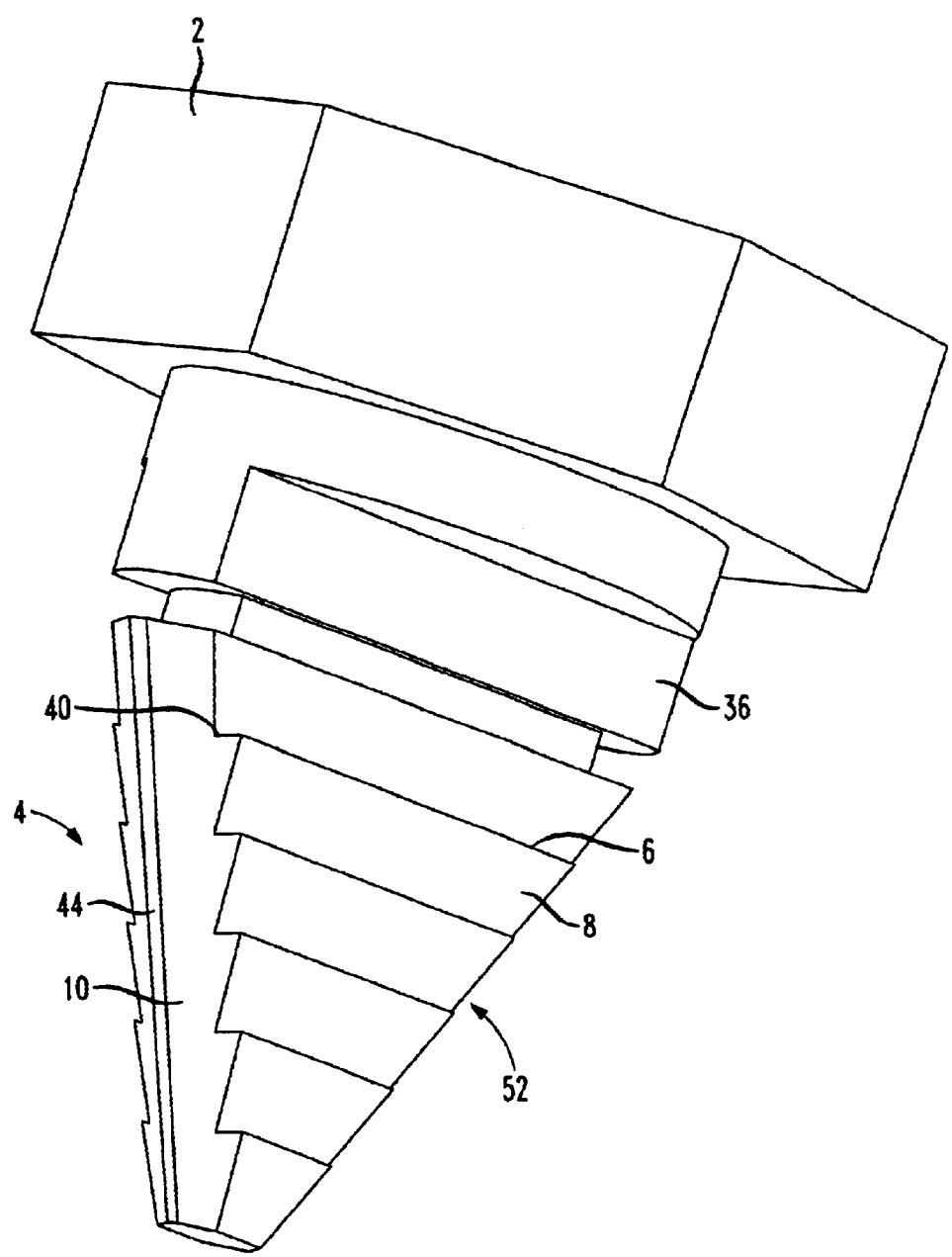
FIG. 1B is a perspective view of the shaft of FIG. 1A.

A quarter turn latch for securely joining an enclosure for equipment, such as telecommunications equipment, in accordance with the present invention, comprises a shaft and a clasp. FIGS. 1A and 1B are a front view and a perspective view, respectively, of an exemplary embodiment of a shaft in accordance with the present invention. The shaft, generally designated 50, of FIGS. 1A and 1B comprises a head 2, a tail 4, at least one set 52 of longitudinally spaced teeth, a tail cam surface 10, and a limiting portion 36. Head 2 may be any appropriate head, such as a Phillips head, a slotted head, a KS-type screw head, and a 216-type screw head, or any combination thereof. The shaft 50 may comprise a single set 52 of teeth or several sets 52 of teeth. Each tooth comprises a shoulder 6 and a tooth cam surface 8. Cam shoulder surface 40 is the surface formed by the intersection of shoulder 6 and tooth cam surface 8.

Figure 1C:
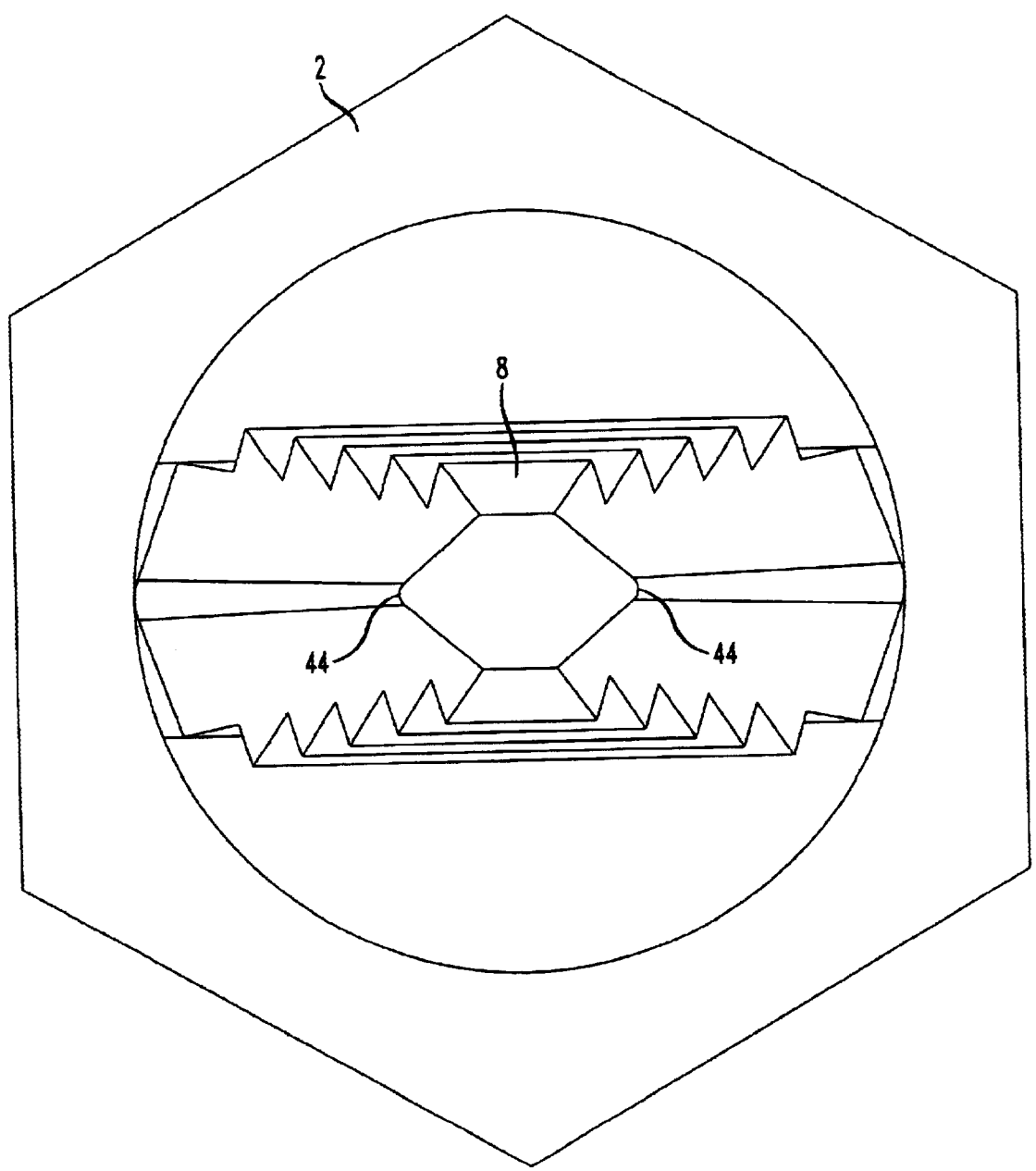
FIG. 1C is a bottom view of the shaft shown in FIGS. 1A and 1B.

Tail cam surface 10 has at least an arcuate portion and comprises apex 44. In one embodiment of the invention, apex 44 is positioned at the annular center of tail cam surface 10, as depicted in FIG. 1A. The annular center of tail cam surface 10 is the line that is equidistant from each adjacent set 52 of teeth on tail 4. The positioning of apex 44 may also be offset from the annular center of tail cam surface 10. As shown in FIG. 1C, which is a bottom view of shaft 50, the outer surface (i.e., cross sectional perimeter) of tail cam surface 10 is rounded such that no discontinuities exist at the edges of apex 44. The lines shown in FIGS. 1A and 1B (as well as other figures) are for illustrative purposes to accentuate the apex 44 of the arcuate tail cam surface 10. Further, the radius of curvature of apex 44 may vary depending upon specifics of the particular application of shaft 50.

In an exemplary embodiment of the invention tail 4 is tapered, such that as the distance from head 2 increases, the diameter of the tail 4 decreases, as indicated in FIGS. 1A and 1B. In another embodiment of the invention, tail 4 is not tapered, such that the diameter of tail 4, taken at the same orientation, is constant regardless of the distance from head 2.

Tail 4 comprises peripherally alternating sets 52 of longitudinally spaced teeth and tail cam surfaces 10. In alternate embodiments of the invention, tail 4 comprises various numbers of sets 52 of teeth interspersed by tail cam surfaces 10. For example, tail 4 may comprise one set 52 of teeth opposite a tail cam surface 10. In another exemplary embodiment, as shown in FIGS. 1A and 1B, tail 4 comprises two sets 52 of teeth alternating peripherally with two tail cam surfaces 10. Thus, it is envisioned that alternate embodiments of tail 4 may comprise any number of peripherally alternating sets 52 of teeth and tail cam surfaces 10 (e.g., three or four).

Figure 2A:
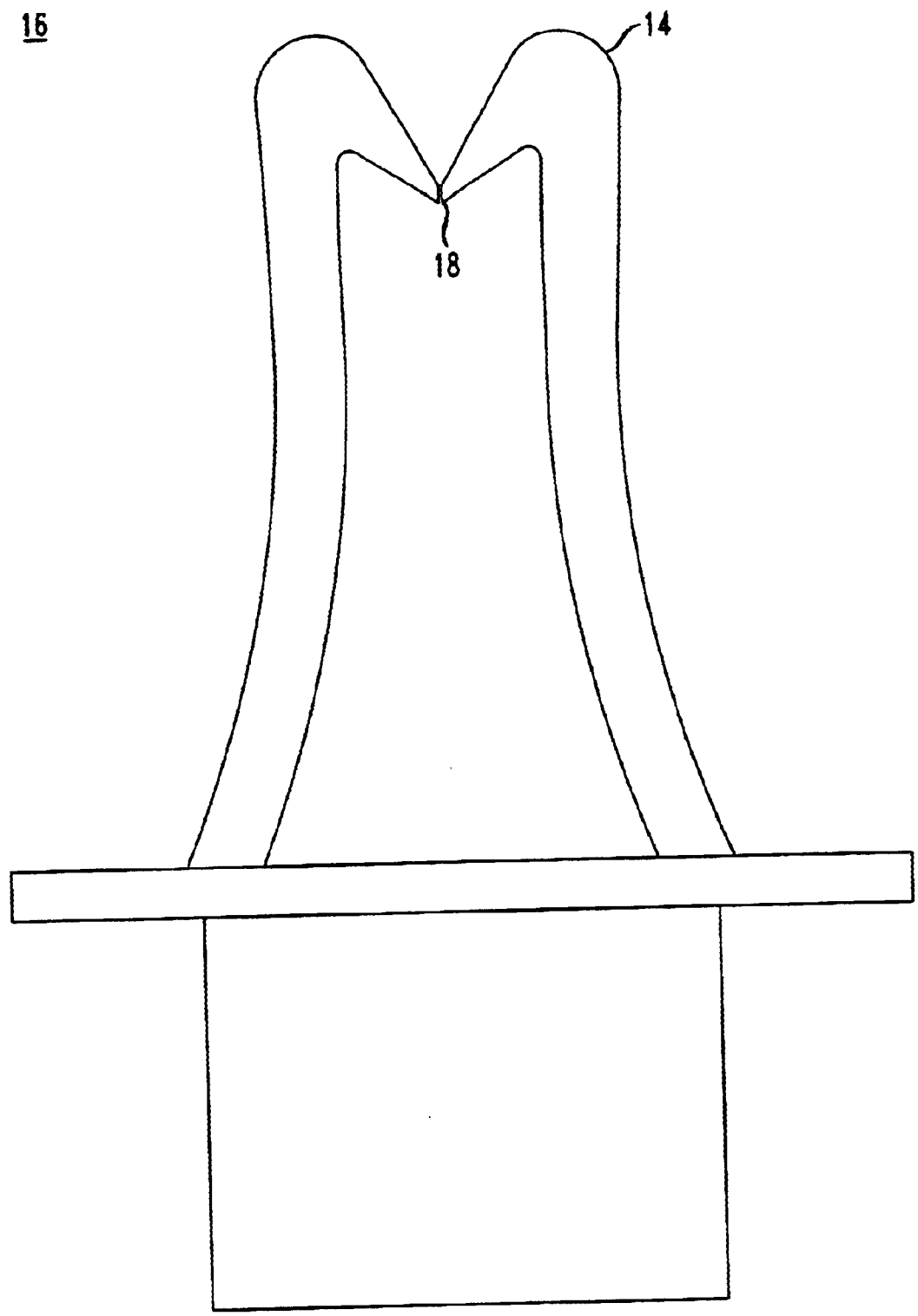
FIG. 2A is a front view of an exemplary embodiment of a clasp in accordance with the present invention.
Figure 2B:
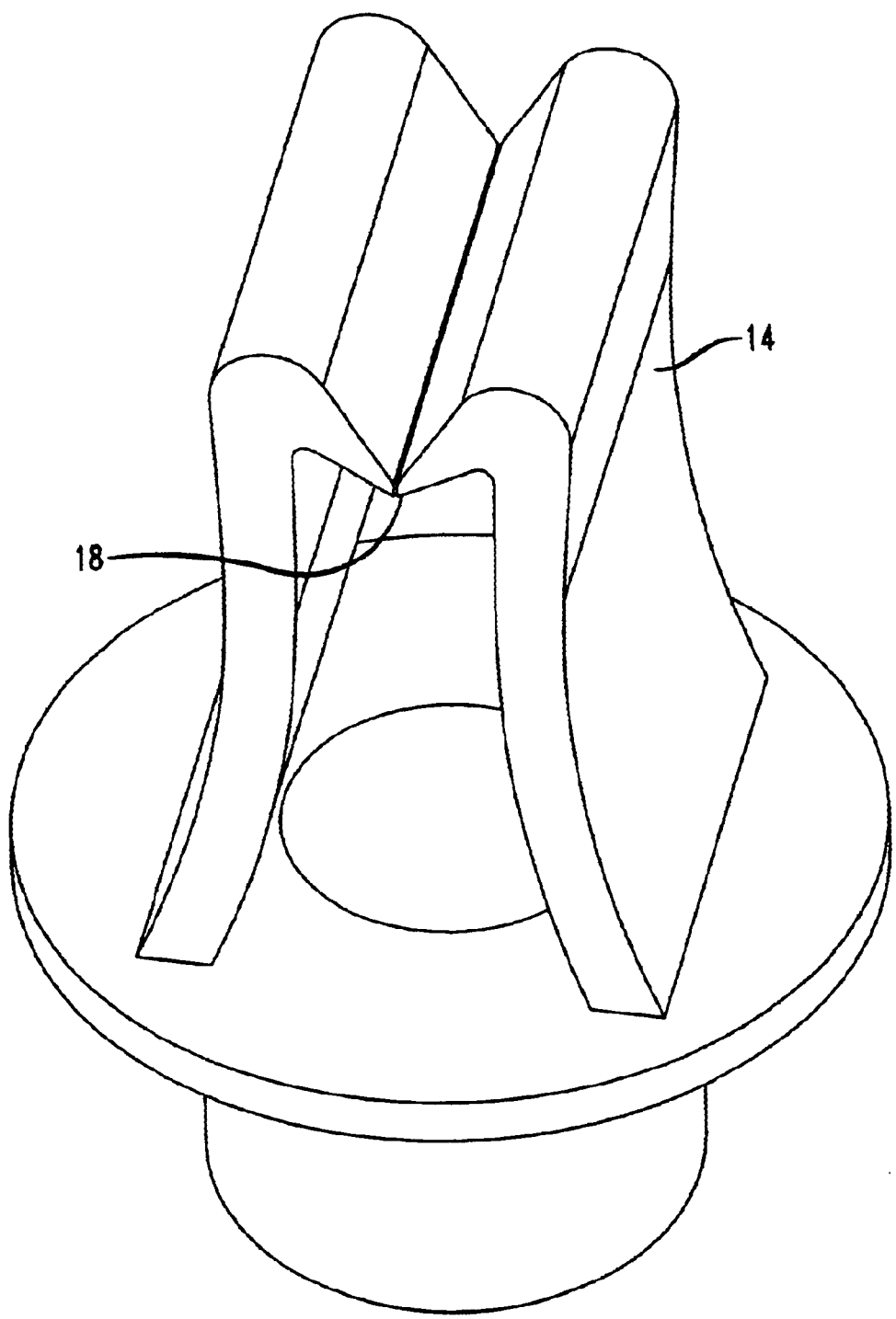
FIG. 2B is perspective view of the clasp of FIG. 2A.

FIGS. 2A and 2B are a front view and a perspective view, respectively, of an exemplary embodiment of a clasp in accordance with the present invention. The clasp, generally designated 16, comprises at least one pawl 14. Each pawl 14 comprises an edge 18. The pawls 14, as depicted by FIGS. 2A and 2B are hooked shaped. In alternate embodiments of the invention, pawls 14 may be any shape (e.g., L shaped, U shaped) capable of engaging with tooth shoulder 6. In alternate embodiments of the invention, clasp 16 comprise various numbers of pawls 14. Clasp 16 may comprise from one to any number of pawls 14. In one embodiment of the invention, the number of pawls 14 is equal to the number of sets 52 of teeth. Pawls 14 are urged radially inward by an inherent force. As will be explained herein, this inherent force facilitates operation of the latch. This inherent force is a consequence of the resilient formation of clasp 16. This resilient formation acts like a spring causing a radially inward force to be manifested upon pawls 14. Clasp 16 may be formed of any appropriate material capable of providing this force, such as plastic, metal, fiberglass, and rubber.

Figure 3A:
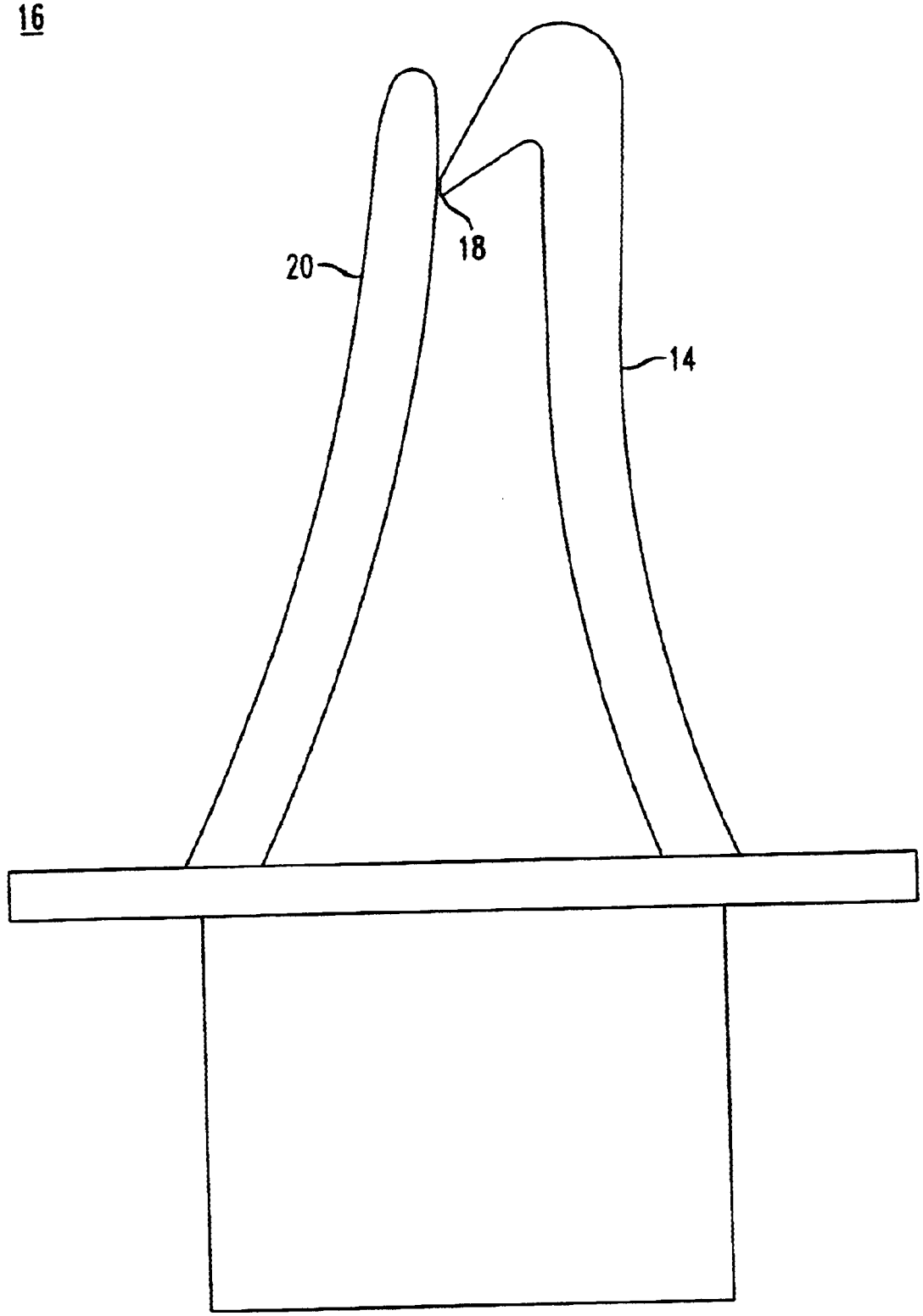
FIG. 3A is an illustration of a clasp comprising a pawl and a spring arm, in accordance with an alternate embodiment of the present invention.
Figure 3B:
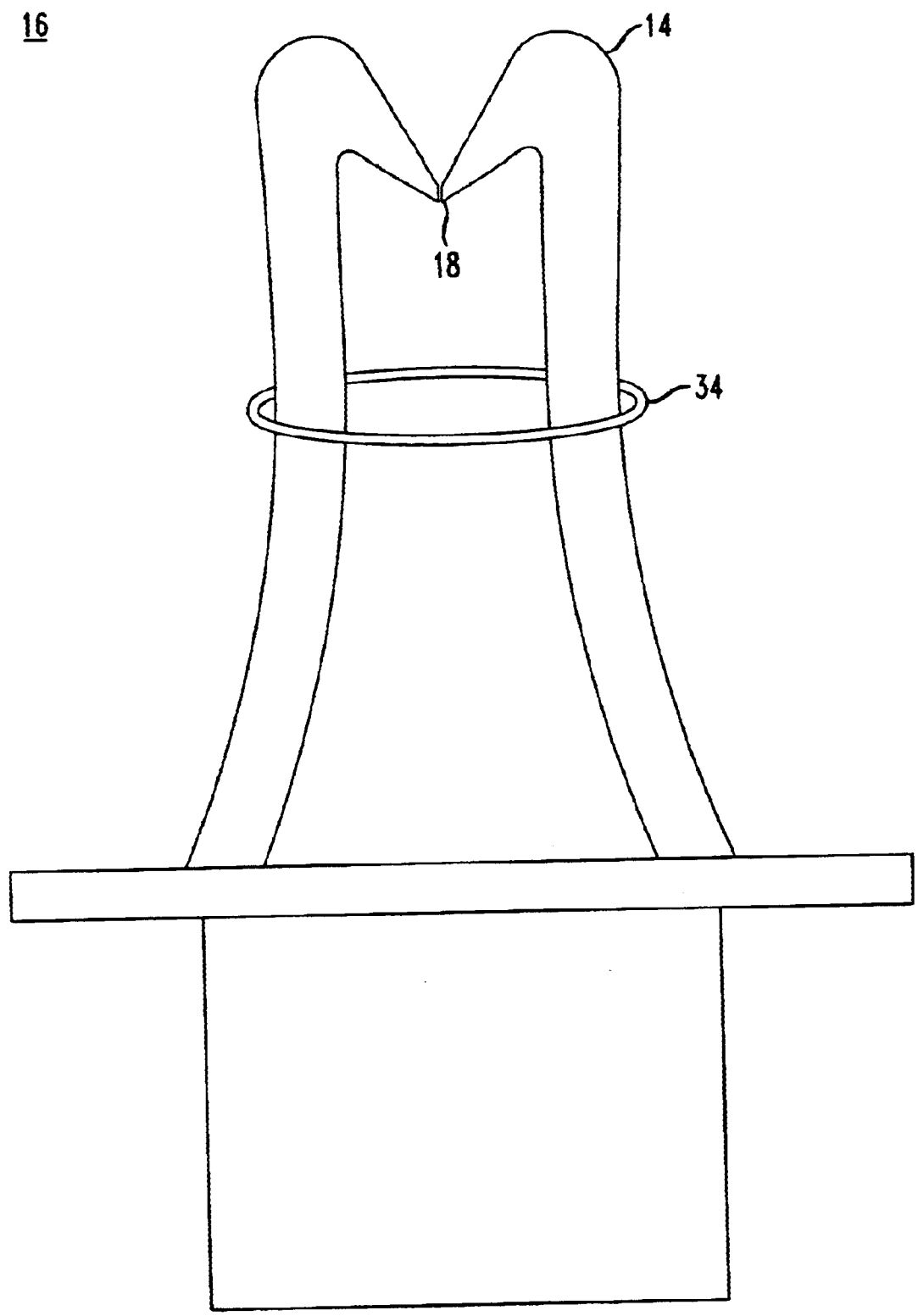
FIG. 3B clasp comprising a band in accordance with an alternate embodiment of the present invention.

FIGS. 3A and 3B illustrate alternate embodiments of clasp 16, in accordance with the present invention. FIG. 3A illustrates a clasp 16 comprising a pawl 14 and a spring arm 20. Both spring arm 20 and pawl 14 are urged radially inward by the inherent force of clasp 16. Clasp 16 may comprise any combination of spring arms 20 and pawls 14, including at least one pawl 14. FIG. 3B illustrates clasp 16 comprising band 34. Band 34 may augment the radially inward force resulting from the resilient formation of clasp 16, or band 34 may be the only source of the radially inward force. Band 34 may be formed of any material having elastic properties, such as rubber and plastic. Band 34 may also be used with spring arm 20.

FIGS. 4A and 4B illustrate two views of shaft 50 inserted into clasp 16, in accordance with the present invention. In FIG. 4A, pawls 14 are in contact with tail cam surfaces 10, and in FIG. 4B, pawls 14 are in contact with sets 52 of teeth. To join (lock) the shaft 50 and clasp 16 of the latch, the shaft 50 is inserted into the clasp 16. When shaft 50 is positioned within clasp 16 such that each pawl 14 is in contact with a tail cam surface 10, as shown in FIG. 4A, the shaft is capable of being extracted from and inserted into the clasp 16. Provided that shaft 50 is prevented from rotating, the smooth surface of tail cam surface 10 allows the pawl edge 18 to ride freely along the tail cam surface 10. The radially inward force on pawls 14 keeps pawl edges 18 in contact with the tail cam surfaces 10. The radially inward force on pawls 14 also causes a longitudinal force in the direction of extraction to be manifested upon the shaft 50.

When shaft 50 is positioned within clasp 16, such that at least one pawl 14 is in contact with a respective set 52 of teeth, as shown in FIG. 4B, the shaft 50 is capable of being further inserted into the clasp 16, and the shaft 50 is prevented from being completely extracted from clasp 16. Assuming the position of clasp 16 is fixed, as shaft 50 is inserted into clasp 16, pawl edges 18 ride along the smooth surface of tooth cam surfaces 8. Tooth cam surfaces 8 are flat such that no rotational forces are manifested upon shaft 50 by the interaction of pawl edges 18 and tooth cam surfaces 8. As insertion continues, pawl edges 18 make contact with tooth shoulders 6 and cam shoulder surfaces 40, and then ride along the next adjacent tooth cam surfaces 8. When the inserting force ceases, assuming the shaft 50 is allowed to move freely, the radially inward force on pawls 14 causes a longitudinal force to be manifested upon shaft 50 in the direction of extraction until pawl edges 18 contact tooth shoulders 6. At this point, the shaft 50 remains in its relative position with respect to clasp 16, and the shaft 50 is prevented from being extracted from clasp 16.

A latch comprising shaft 50 and clasp 16 is self-locking. This self-locking feature provides a secure joining of the shaft 50 and the clasp 16, allowing a technician to lock the latch without using a tool simply by inserting the shaft 50 into the clasp 16. Assuming the position of clasp 16 is fixed and the shaft 50 is allowed to rotate freely, the relative orientation of shaft 50 and clasp 16 will be as depicted in either FIG. 4A or FIG. 4B. That is, pawls 14 will either be in contact with tail cam surfaces 10 or sets 52 of longitudinally spaced teeth. When the shaft 50 is inserted into the clasp 16 such that at least one pawl 14 is in contact with a respective set 52 of teeth, the shaft 50 and clasp 16 react as described above with respect to FIG. 4B. Thus, the shaft 50 is joined with the clasp 16 and the latch is locked.

Alternatively, shaft 50 may be inserted into the clasp 16 such that each pawl 14 is in contact with a tail cam surface 10, as shown in FIG. 4A. In this case, the radially inward force on pawls 14 and the arcuate shape of tail cam surfaces 10 urges the shaft 50 to rotate. For example, when pawl edges 18 are in contact with apexes 44, the radially inward force on the pawls 14 will cause a rotational force (i.e., torque) upon the shaft 50. This torque will be manifested regardless of where pawl edges 18 contact the tail cam surfaces 10. The torque manifested upon the shaft 50 causes shaft 50 to rotate until pawls 14 make contact with the sets 52 of teeth. At this point rotation of shaft 50 ceases, and the shaft 50 and clasp 16 react as previously described herein with respect to FIG. 4B. Thus, as shaft 50 is inserted into clasp 16 such that pawl edges 18 are in contact with tail cam surfaces 10, both a longitudinal force (in the direction of insertion) and a rotational force are manifested upon shaft 50 concurrently. The rotational force causes pawl edges 18 to contact sets 52 of teeth, resulting in the latch being locked.

If the force of insertion ceases before the pawl edges 18 contact the sets 52 of teeth, shaft 50 is then subject to a longitudinal force in the direction of extraction concurrent with the rotational force. In this case too, the rotational force manifested upon shaft 50 causes the pawl edges 18 to contact the sets 52 of teeth. Thus, independent of the initial relative positioning of shaft 50 and clasp 16 upon insertion, a technician may simply push shaft 50 into clasp 16 to lock the latch.

Figure 5A:
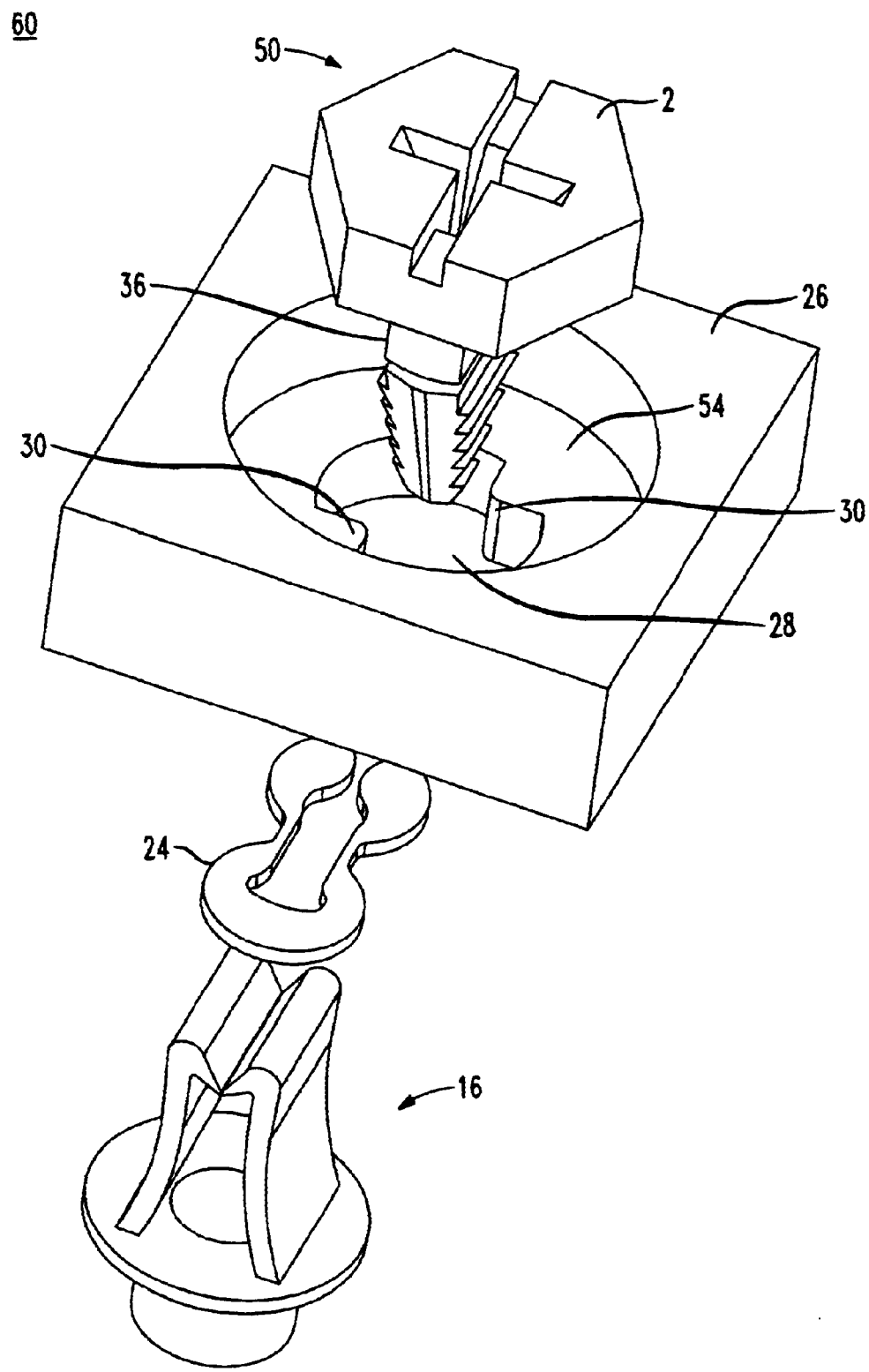
FIG. 5A is an exploded view of an exemplary embodiment of a latch comprising a cover in accordance with the present invention.
Figure 5B:
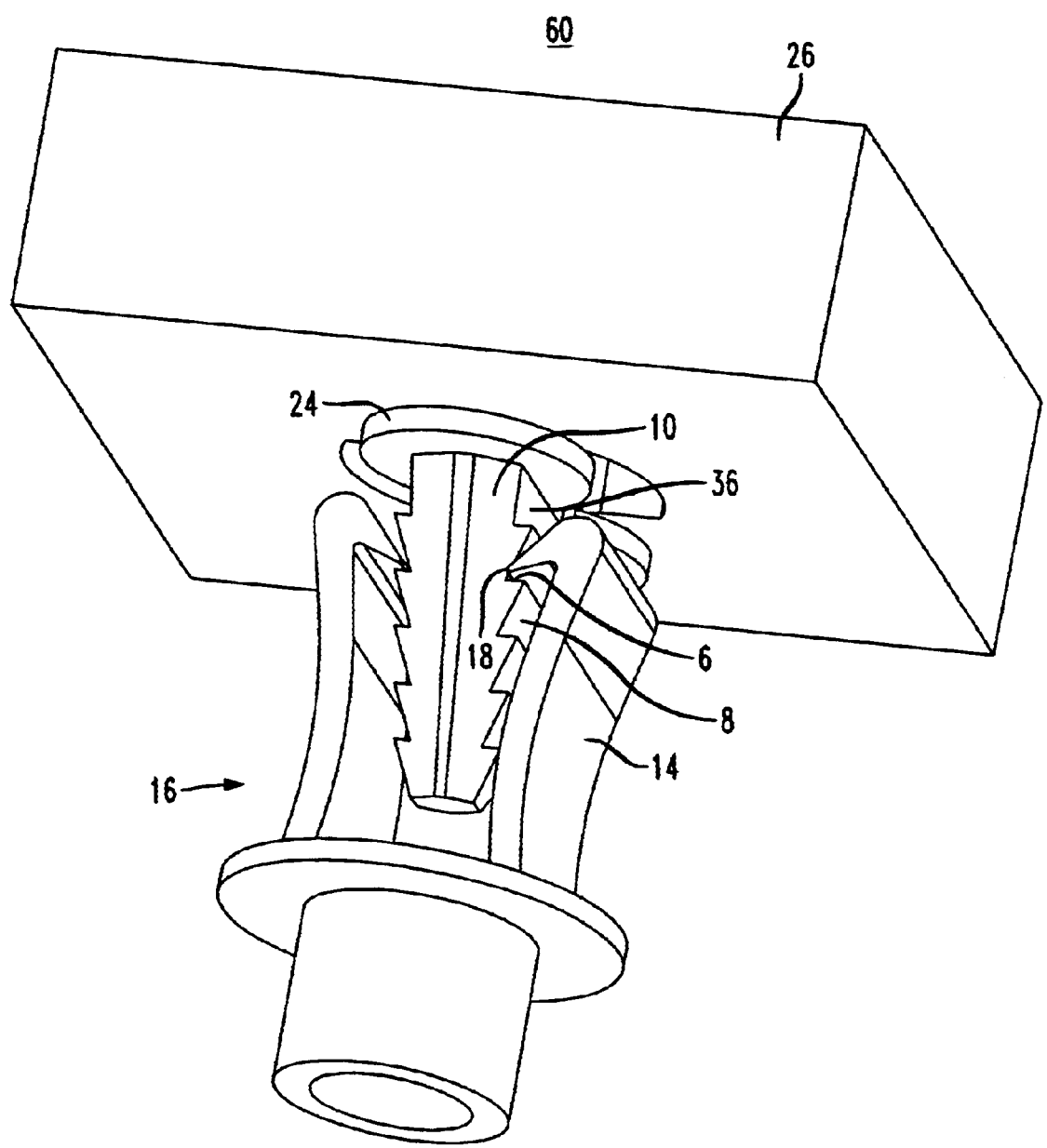
FIG. 5B is a composite view of the latch of FIG. 5A.

An application of a latch in accordance with the present invention is to securely join (lock) an enclosure for equipment. Typically, an enclosure comprises a cover and a housing, which when securely joined, prevents access to the equipment. In an exemplary embodiment of the present invention, clasp 16 is attached to a housing and shaft 50 is attached to a cover. FIGS. 5A and 5B are an exploded view and a composite view, respectively, of an exemplary embodiment of a latch comprising a cover in accordance with the present invention. The latch, generally designated 60, comprises cover 26, retaining clip 24, and opening 28. Opening 28 comprises stops 30. Shaft 50 is inserted into the recessed portion of cover 26 and through opening 28. When shaft 50 is completely inserted into cover 26, head 2 is in contact with the recessed surface 54 of cover 26 and the limiting portion 36 is protruding through the opposite surface of cover 26. As is well understood in the art, retaining clip 24 is attached to limiting portion 36 and is shaped such that it will not slip off of shaft 50 after it is attached to limiting portion 36. This attaching procedure allows shaft 50 to be rotated within opening 28. However, the rotational motion of shaft 50 is limited by stops 30.

Figure 6:
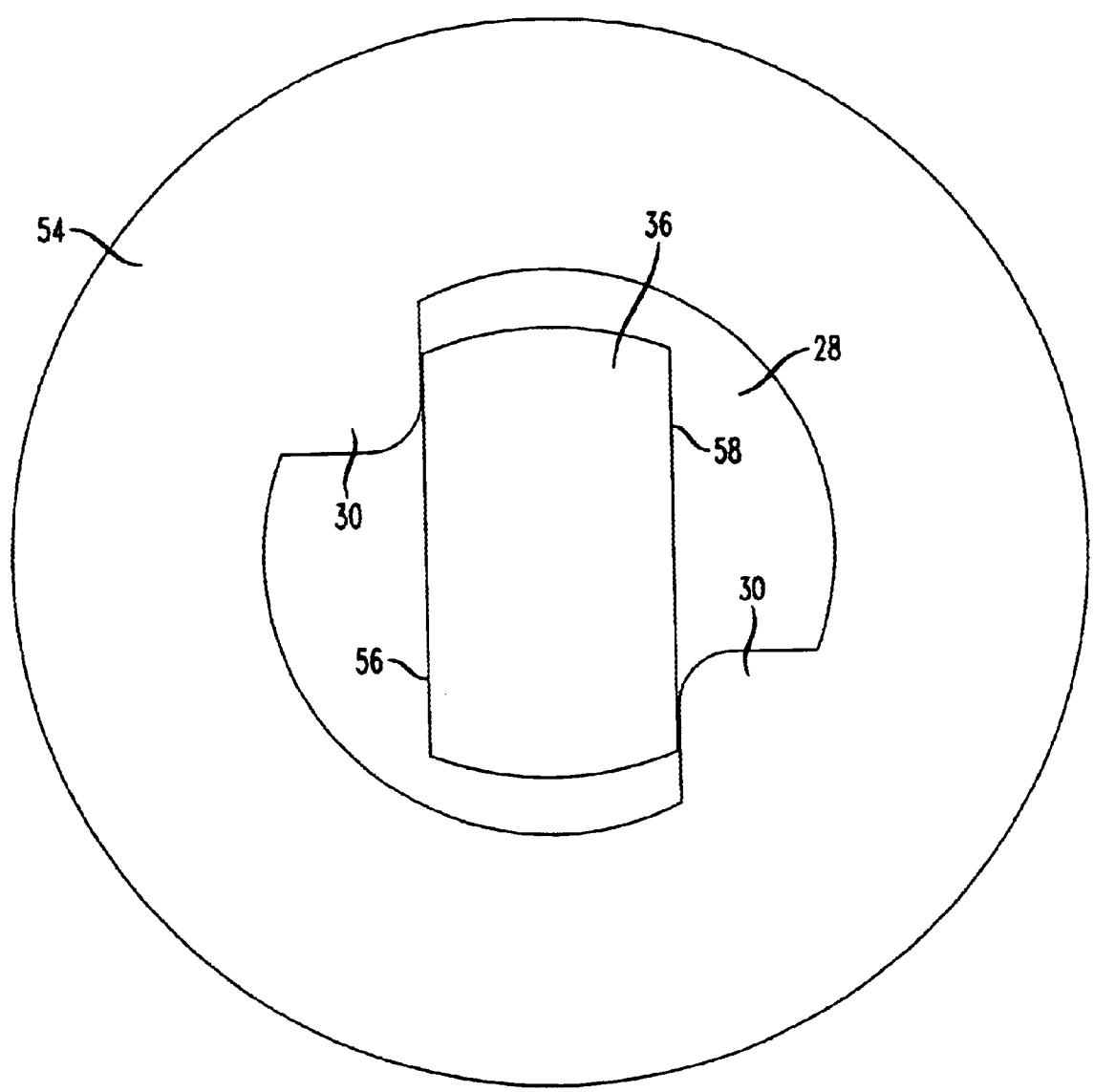
FIG. 6 is diagram illustrating the limiting portion of the shaft positioned within the opening of the cover in accordance with the present invention.

FIG. 6 is diagram illustrating limiting portion 36 positioned within opening 28. As shown in FIG. 6, the edges of limiting portion 36 are in contact with stops 30. Limiting portion 36 may not undergo any further counterclockwise rotation. However, limiting portion 36 may be rotated clockwise until edges 56 and 58 contact stops 30. Thus, the full rotational motion of limiting portion 36, and therefore shaft 50, is limited to an arc of 90 degrees (i.e., a quarter of a full 360 rotation). In an exemplary embodiment of the invention, shaft 50 and clasp 16 are aligned such that pawls 18 are in contact with tail cam portion 10 when shaft 50 is rotated to its limit in one direction, and pawls 18 are in contact with sets 52 of teeth when shaft 50 is rotated to its limit in the other direction. Thus, for example, a technician may insert a tool into head 2 and turn shaft 50 counterclockwise to its limit to unlock an enclosure. The technician may then simply push the cover toward the housing to lock the enclosure.

Figure 7B:
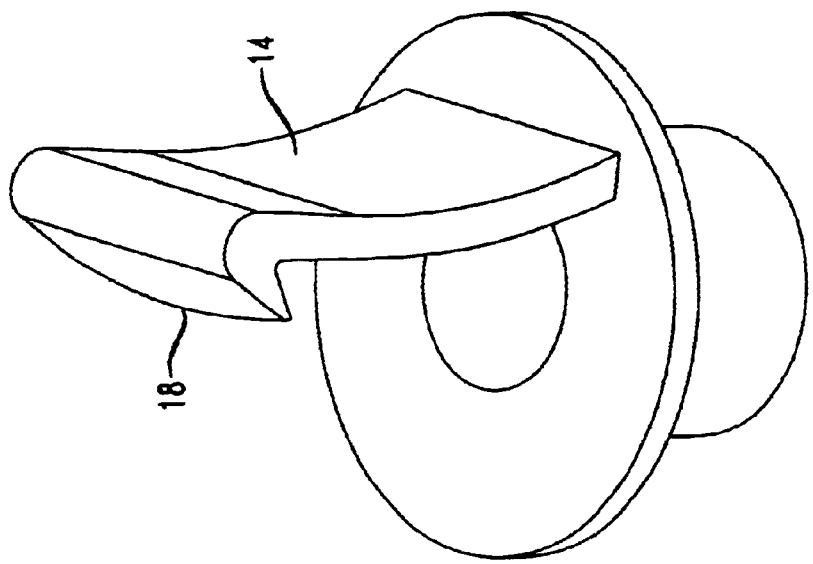
FIG. 7B is a diagram of an exemplary pawl having a curved edge in accordance with the present invention.
Figure 7A:
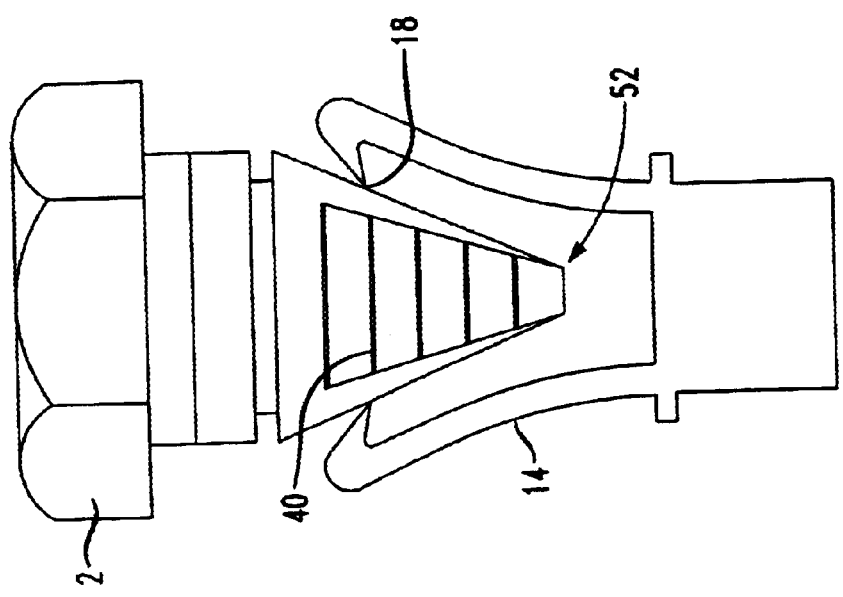
FIG. 7A is a diagram of an exemplary latch having sets of longitudinally spaced teeth recessed in the tail of the shaft in accordance with the present invention.
Figure 8:
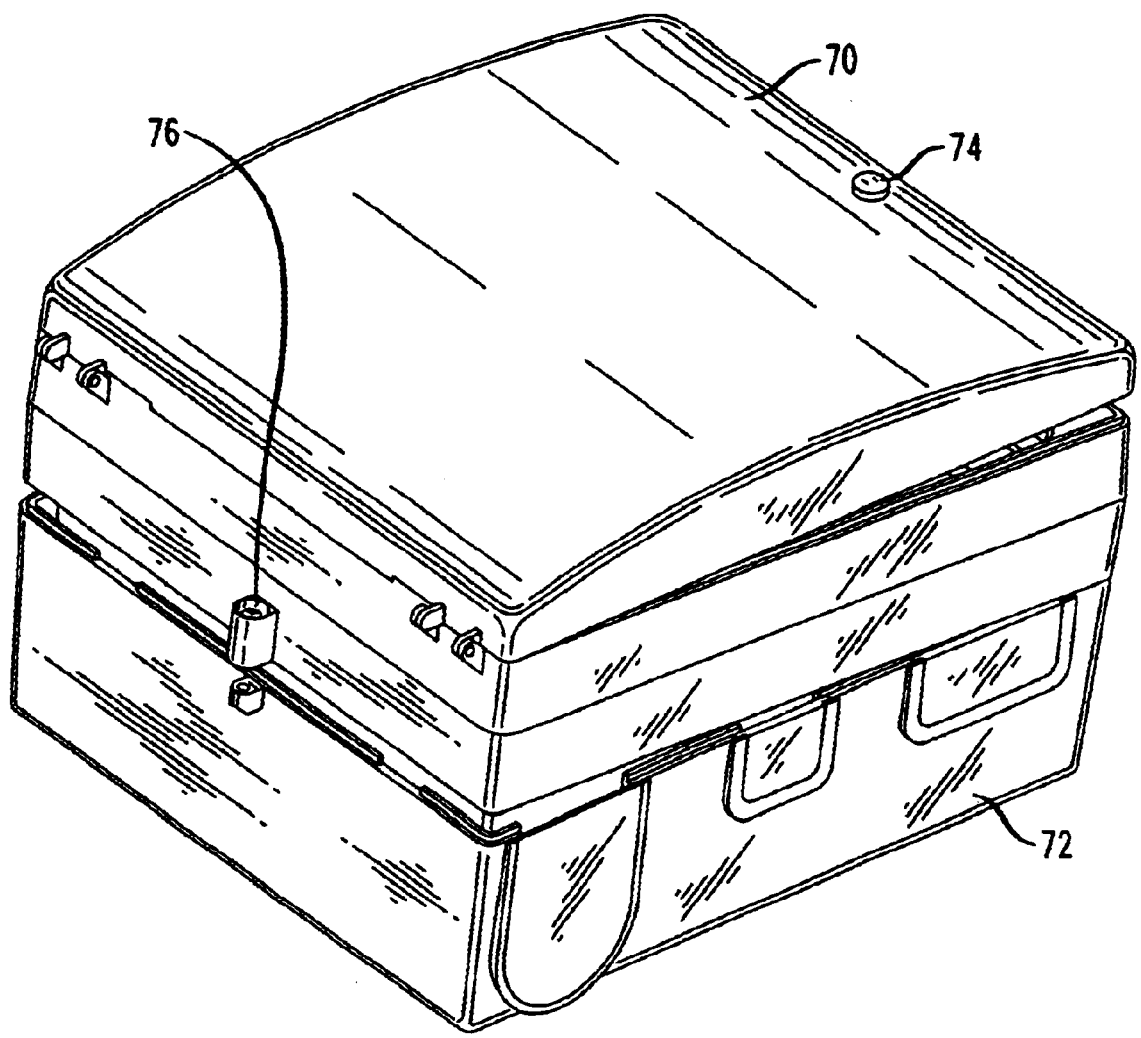
FIG. 8 (prior Art) is a diagram of a building entrance protector, FIGS. 9A and 9B (Prior Art) show a side view and a top view, respectively, of conventional 216-type screw, FIGS 10A and 10B (Prior Art) show a side view and a top view, respectively, of conventional KS-type screw, FIGS. 11A and 11B (Prior Art) show a side view and a top view, respectively, of a combination of KS-type and 216-type screw.
Figure 9A:
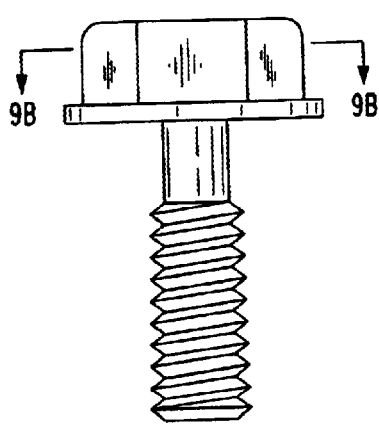
Figure 9B:
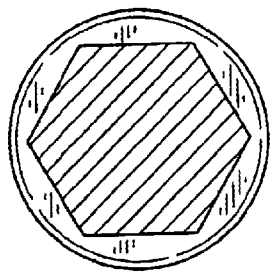
Figure 10A:
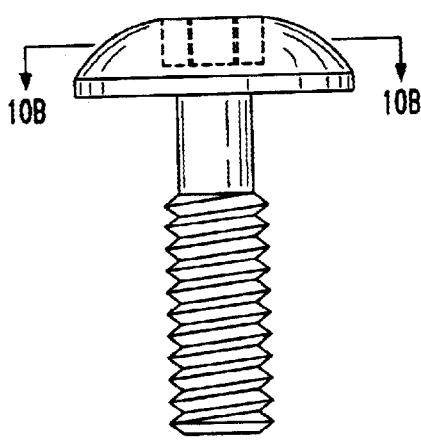
Figure 10B:
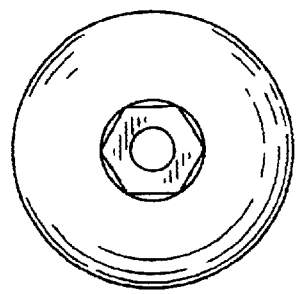
Figure 11A:
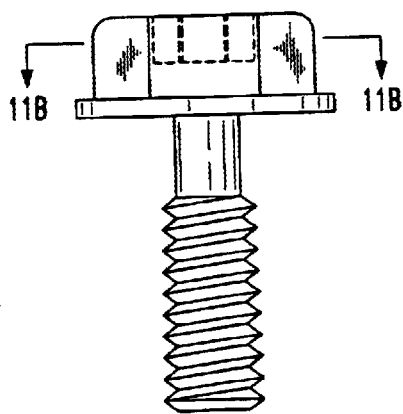
Figure 11B:
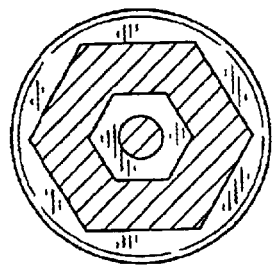

FIGS. 7A and 7B are diagrams of another embodiment of a set 52 of teeth and a pawl 18, respectively, in accordance with the present invention. In FIG. 7A, set 52 of longitudinally spaced teeth are recessed in tail 4 such that the outer edge of the set 52 of teeth is flush with the tail cam surfaces 10. Recessed sets 52 of teeth facilitate pawls 18 contacting the sets 52 of teeth as a result of the rotational motion of shaft 50. To facilitate unlocking the latch, pawls 18 are curved, as depicted in FIG. 7B. The curvature of pawls 18 allows the technician to rotate shaft 50 to disengage pawls 18 from sets 52 of teeth (unlock) more easily than if pawls 18 were not curved. In yet another embodiment of the invention, cam shoulder surfaces 40 are curved (not shown) to further facilitate unlocking the latch.

Thus, a latch in accordance with the present invention enables a technician to lock an enclosure by simply slamming the cover 26 shut, enables a technician to unlock the enclosure by rotating the shaft 50 by a quarter turn, prevents unauthorized access to the enclosure, provides quick and easy access to the enclosure by technicians, reduces the labor time associated with maintaining and repairing equipment housed in enclosures, is applicable to a wide variety of equipment enclosures such as fiber optic interconnection devices, fiber closures, and fiber cross connect fields, and may be used in a variety of environments.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. A latch for joining a cover to a housing, said latch comprising:
   a shaft comprising a head and a tail, said tail comprising at least one set of longitudinally spaced teeth alternating with at least one tail cam surface, each tooth of said longitudinally spaced teeth having a shoulder facing said head and having a tooth cam surface, a portion of a cross section of each tail cam surface being arcuate;
   a clasp comprising at least one pawl, wherein each of said at least one pawl is in contact with one of said tail cam surface, said tooth cam surface, and said shoulder when said tail is inserted into said clasp.

2. A latch in accordance with claim 1, wherein said tail is tapered such that as a distance from said head increases a diameter of said tail at said distance decreases.

3. A latch in accordance with claim 1, wherein the shaft has two sets of teeth and an apex of said tail cam surface is positioned at a portion of said tail cam surface midway between the two sets of teeth.

4. A latch in accordance with claim 1 further comprising at least one spring arm, wherein each of said at least one pawl and each of said at least one spring arm is in contact with one of said tail cam surface portion, said tooth cam surface, and said shoulder when said tail is inserted into said clasp.

5. A latch in accordance with claim 1, wherein a number of pawls is equal to a number of sets of longitudinally spaced teeth.

6. A latch in accordance with claim 1, wherein said tail is capable of being inserted into said clasp and said tail is prevented from being extracted from said clasp when at least one of said at least one pawl is in contact with at least one shoulder.

7. A latch in accordance with claim 1, wherein said tail is capable of being extracted from said clasp and inserted into said clasp when each of said at least one pawl is in contact with at least one of said at least one tail cam surface.

8. A latch in accordance with claim 1, wherein said at least one set of longitudinal-spaced teeth are recessed in said tail such that an outer edge of said at least one set of longitudinal-spaced teeth is flush with said at least one tail cam surface.

9. A latch in accordance with claim 8, wherein an edge of each pawl is capable of contacting said tooth cam surface is rounded to facilitate rotation of said shaft.

10. A latch in accordance with claim 9, further comprising a cam-shoulder surface formed by the intersection of said shoulder and said tooth cam surface, wherein said cam-shoulder surface is rounded to facilitate rotation of said shaft.

11. A latch in accordance with claim 1, wherein each pawl is urged radially inward by an inherent force, said inherent force being a consequence of a resilient deformation of said clasp.

12. A latch in accordance with claim 11, wherein when rotational positioning of said shaft is prohibited, responsive to said inherent force, said shaft is urged in a direction of extraction when said at least one pawl is in contact with said tail cam surface and said shaft is urged in a direction of insertion when said at least one pawl is in contact with said tooth cam surface.

13. A latch in accordance with claim 11, wherein responsive to said inherent force, said shaft is rotationally urged to cause at least one of said at least one pawl to be in contact with at least one of said at least one set of longitudinally spaced teeth.

14. A latch in accordance with claim 1, wherein said head is selected from the group consisting of a cross-slotted screw head, a slotted head, a KS-type screw head, a 216-type screw head, and a combination KS-type and 216-type screw head.

15. A latch in accordance with claim 1 further comprising an opening defined by said cover, said shaft being positioned within said opening, said opening comprising at least one stop for limiting rotational motion of said shaft, wherein said shaft further comprises a limiting portion for making contact with said at least one stop.

16. A latch in accordance with claim 15 further comprising a retaining clip for attaching said shaft to said cover, said retaining clip attaching to said limiting portion of said shaft.

17. A latch in accordance with claim 15, wherein said rotational motion is limited to 90 degrees.

18. A latch in accordance with claim 17, wherein;
said shaft is capable of being inserted into said clasp and extracted from said clasp when said shaft is rotated to a first limit of said rotational motion; and
said shaft is capable of being inserted into said clasp and prevented from being extracted from said clasp when said shaft is rotated 90 degrees to a second limit of said rotational motion.

19. The latch of claim 1, wherein:
the latch is a quarter turn latch, said head is selected from the group consisting of a cross-slotted screw head, a slotted head, a KS-type screw head, and a 216-type screw head;
said tail is a tapered tail, said tapered tail being tapered such that as a distance from said head increases a diameter of said tapered tail at said distance decreases, said tapered tail comprising two sets of longitudinally spaced teeth and two tail cam surfaces, said two sets of longitudinally spaced teeth and said two tail cam surfaces alternating with each other, and
said shaft has a limiting portion for limiting motion of said shaft and for attaching said shaft to said cover; and
said clasp comprises two pawls, each pawl being pushed radially inward by an inherent force, said inherent force being a consequence of a resilient deformation of said clasp, wherein responsive to said inherent force:
when rotational positioning of said shaft is prohibited, said shaft is urged in a direction of extraction when each pawl is in contact with a respective tail cam surface and said shaft is urged in a direction of insertion when each pawl is in contact with a respective tooth cam surface; and
said shaft is rotationally urged to cause at least one of said two pawls to be in contact with a respective at least one of said two sets of longitudinally spaced teeth;

said latch having an opening defined by said cover, said shaft being positioned within said opening, said opening comprising a pair of stops for limiting rotational motion of said shaft to 90 degrees by making contact with said limiting portion of said shaft, wherein:
said shaft is capable of being inserted into said clasp and extracted from said clasp when said shaft is rotated to a first limit of said rotational motion;
said shaft is capable of being inserted into said clasp and prevented from being extracted from said clasp when said shaft is rotated 90 degrees to a second limit of said rotational motion; and said latch having a retaining clip for attaching said shaft to said cover, wherein said retaining clip is attached to said limiting portion of said shaft.

20. A latch for joining a cover to a housing, said latch comprising:
a shaft comprising a head and a tail, said tail comprising at least one set of longitudinally spaced teeth alternating with at least one tail cam surface, each tooth of said longitudinally spaced teeth having a shoulder facing said head and having a tooth cam surface, at least a portion of a cross section of each tail cam surface being arcuate; and
a clasp comprising at least one pawl, wherein:
each of said at least one pawl is in contact with one of said tail cam surface, said tooth cam surface, and said shoulder when said tail is inserted into said clasp;
each pawl is urged radially inward by an inherent force, said inherent force being a consequence of a resilient deformation of said clasp; and
responsive to said inherent force, said shaft is rotationally urged to cause at least one of said at least one pawl to be in contact with at least one of said at least one set of longitudinally spaced teeth.

* * * * *